June 14, 1949.                    C. W. MILLER ET AL                    2,472,980
                           MEASURING SYSTEM AND SATURABLE
                                REACTOR FOR USE THEREIN
Filed Jan. 22, 1948                                                 2 Sheets-Sheet 1
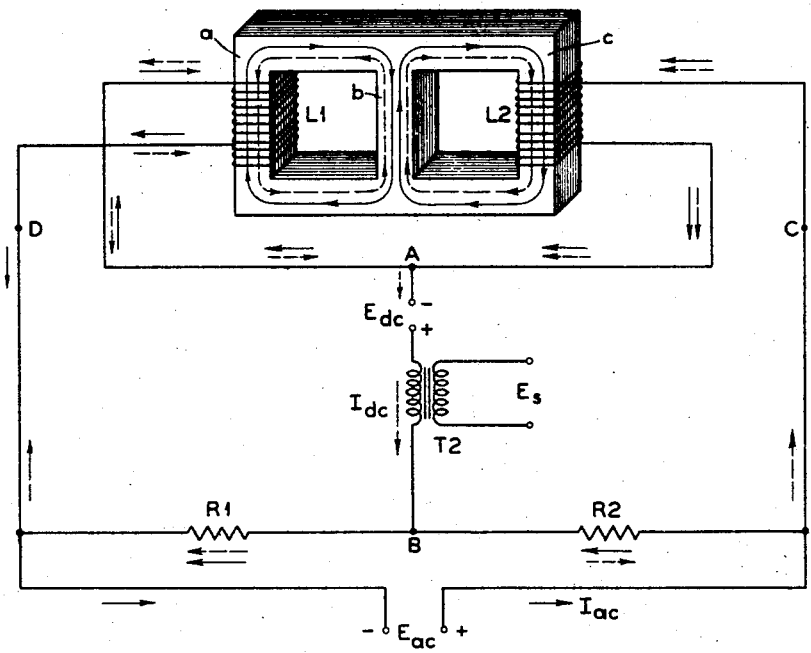
FIG. 1
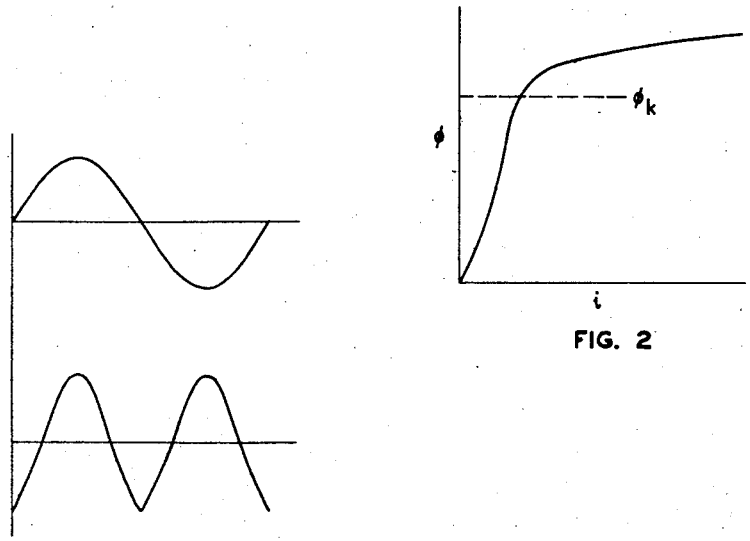
FIG. 3
FIG. 2
INVENTOR.
CARLTON WESLEY MILLER
NATHANIEL B. NICHOLS
BY
ATTORNEY June 14, 1949. C. W. MILLER ET AL 2,472,980
MEASURING SYSTEM AND SATURABLE
REACTOR FOR USE THEREIN
Filed Jan. 22, 1948 2 Sheets-Sheet 2
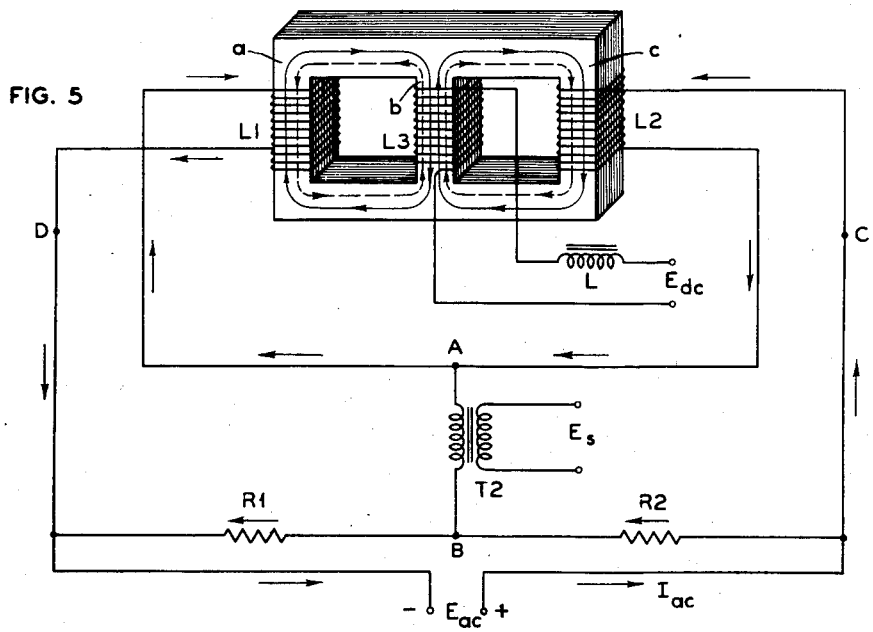
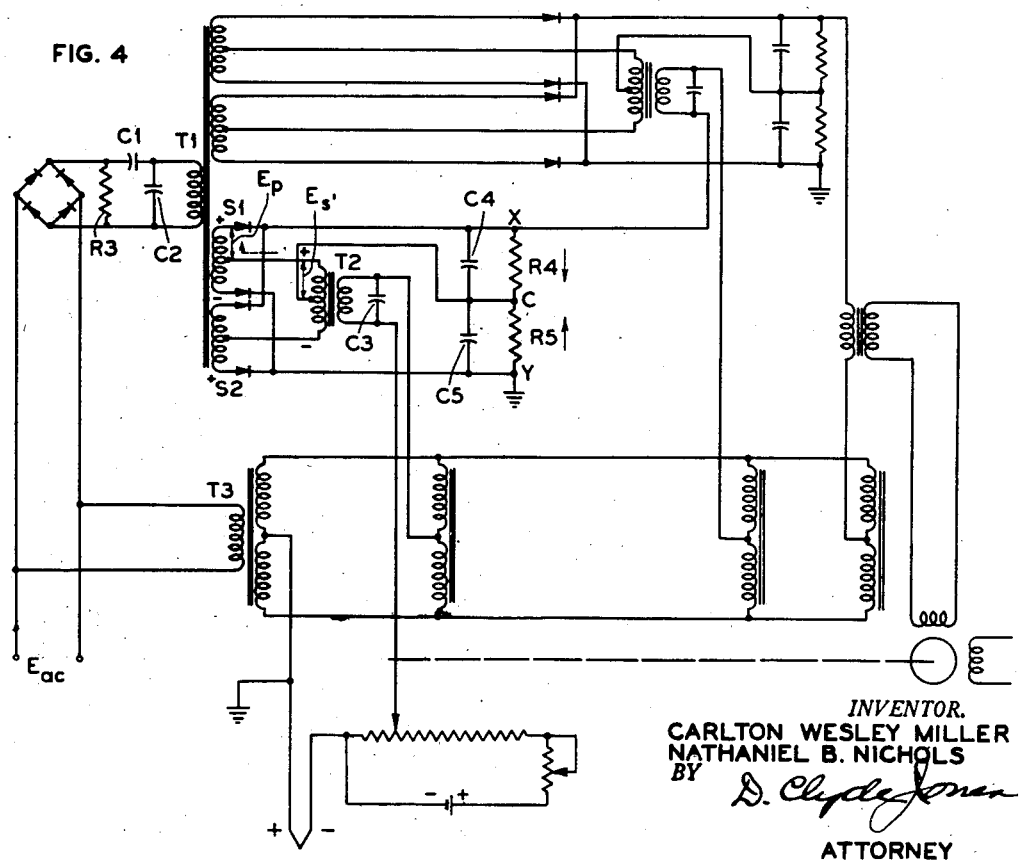
INVENTOR.
CARLTON WESLEY MILLER
NATHANIEL B. NICHOLS
BY
ATTORNEY Patented June 14, 1949

2,472,980

UNITED STATES PATENT OFFICE 2,472,980

MEASURING SYSTEM AND SATURABLE REACTOR FOR USE THEREIN

Carlton W. Miller and Nathaniel B. Nichols, Rochester, N. Y., assignors to Taylor Instrument Companies, Rochester, N. Y., a corporation of New York Application January 22, 1948, Serial No. 3,758

4 Claims. (Cl. 332—51)

This invention relates to saturable reactors which function as magnetic amplifiers and modulators and also relates to measuring and controlling systems using the same.

The purpose of this invention is to provide apparatus of this type which has a minimum inherent error, which has a minimum drift from the accurate value and which has a high degree of reliability in operation.

The various features and advantages of the invention will appear from the detailed description and claims when taken with the drawings in which:

Fig. 1 is a diagrammatic showing of a magnetic amplifier and modulator circuit;

Fig. 2 is a permeability curve of a very general nature relating current flow to total magnetic flux;

Fig. 3 is a typical graph of the developed output signal;

Fig. 4 is a wiring diagram of a commercial form of measuring and controlling system incorporating the present magnetic amplifier and modulator; and Fig. 5 is a diagrammatic showing of a modified magnetic amplifier and modulator circuit.

The fundamental principles of the present magnetic amplifier and modulator will be described in connection with Fig. 1 which is a basic circuit. It should be noted that the amplifier is essentially a bridge circuit composed of two inductance coils L1 and L2, and two resistances, R1 and R2. The coils L1 and L2 are wound on the outer legs "a" and "c" of a three-legged laminated core structure of ferromagnetic material. The two coils are similar and consist of many turns of wire. These windings are connected in series and are connected across the alternating current source in parallel with the series connected resistances R1 and R2. The direct current input voltage or signal voltage source, in series with the primary winding of an output transformer, is connected between the resistors and coils as shown. The exact shape of the curve relating the current $i$, to the total magnetic flux, in any leg of the reactor core is determined by the core material, the number of turns of wire, and the exact nature of the magnetic circuit. Fig. 2 illustrates a curve of the general shape that would be expected. In this description attention is directed to the results obtained when the magnetic flux has a value at or near the knee of the curve as designated by $k$. In other words, when the core is almost saturated.

Referring to Fig. 1, let it be assumed that an alternating voltage is applied to the amplifier of magnitude $E_{ac}$. The actual value of $E_{ac}$ will be such as to maintain the core flux density (with no external direct current signal) somewhere near the point of saturation as designated by $k$ in Fig. 2. If this alternating voltage has an instantaneous polarity as indicated, a current $I_{ac}$ is thereby caused to flow in a direction indicated by the short solid arrows. The fact that the current lags behind the voltage by an amount dependent upon the inductance in the circuit will be disregarded herein.

The current, flowing through coil L2, produces a flux with lines of force in a clockwise direction (for the instantaneous polarity shown) around the reactor legs $c$ and $b$ as indicated by the continuous solid arrows. This same current, flowing through coil L1, results in a similar flux in the reactor legs $a$ and $b$, but with the lines of force in the opposite direction in leg $b$ as indicated by the continuous solid arrows. These fluxes, being of equal density and opposite in direction (ignoring any peculiarities in the magnetic material), cancel in the return leg $b$ of the reactor. Essentially, the magnitude of the current is limited only by the impressed voltage and the impedance of the two coils, where the impedance is equal to the resistance plus the inductance. In order to avoid a highly technical discussion, only changes in inductance will be considered in describing the functioning of the magnetic amplifier. For this purpose the inductance may be defined as the instantaneous value of the coefficient relating the back electromotive force and the time rate of change of current. As the flux in the core material approaches the saturated value, the slope of the curve relating current flow to total magnetic flux decreases. The inductance is proportional to this slope (called incremental permeability) such that as the core approaches saturation the inductance decreases, allowing a larger current to flow.

A current path is also provided through resistances R1 and R2. These are similar resistances, but are very small compared to the combined resistance and inductance of reactor coils L1 and L2. Therefore, the resistances R1 and R2 contribute practically nothing in the way of impedance to current flow. Actually, they function only to provide a fixed center tap (potential reference tap) at point B for the voltage $E_{ac}$. For the conditions outlined above, the resistance ratio of R1 and R2 equals the impedance ratio of L1 to L2. Therefore, the ratio of voltage drops will be equal and no potential difference appears across the output. In other words, the bridge is balanced and no alternating current flows through the primary of the output transformer.

Let it be assumed that a direct current voltage of magnitude $E_{dc}$ is supplied to the control signal terminals (input) of the amplifier with a polarity as noted. This voltage may be very small. A current, $I_{dc}$, is caused to flow, the direction being indicated by the short dotted arrows. With the polarity and direction of current flow shown, the current divides at the potential reference tap B and flows in opposite directions through the resistances R1 and R2 and the reactor coils L1 and L2. It will be noted that the direct current flowing through coil L2 is in the same direction as the assumed instantaneous alternating current flowing through the coil. This direct current produces a flux which adds to the alternating flux causing the core material of reactor leg c to become more saturated. This has the effect of lowering the inductance of coil L2 such that a larger current will flow in the coil at the peak of the positive half cycle. At the same time, the direct current flowing through coil L1 is in a direction opposite to the assumed instantaneous alternating current flowing through the coil. The direct current thus produces a flux which subtracts from the alternating flux, thereby reducing the total flux within reactor leg a. In this period the impedance of coil L1 remains nearly constant. It will be seen that the degree of saturation and the resulting current flow in the reactor coils is directly related to the magnitude and polarity of the direct current input or signal voltage.

When the inductance of coil L2 is lowered a condition of unbalance in the bridge exists, the magnitude depending upon the degree to which reactor leg c becomes further saturated by the direct current input signal. The result of this unbalanced condition is an alternating current potential difference between point A of the reactor circuit and the potential reference tap B. This potential difference, existing across the primary of the output transformer, induces an alternating current output signal in the secondary which is quite linear with respect to the direct current input signal. The alternating current output signal has a value that is many times the power level of the direct current input signal. It will be noted that if the sign of the direct current input or signal voltage is reversed, the sign of the output current, at any instant, is also reversed.

In the foregoing description, the sequence of operations set forth, relate only to one instantaneous polarity as was assumed for the applied alternating current voltage. It will be seen that this instantaneous value of polarity holds only for one half cycle of the alternating current voltage wave. On the other half cycle the polarity shifts and the solid arrows representing $I_{ac}$ in Fig. 1 are reversed. This reversal of polarity occurs sixty times per second for a normal alternating current line frequency of sixty cycles. At the instant that the alternating current polarity is reversed, the direct current flowing through coil L1 is in the same direction as the alternating current. This direct current produces a flux which adds to the alternating current to further saturate the core material of reactor leg a. The inductance of coil L1 is thereby lowered so that a larger current flows in the coil at the peak of the negative half cycle. At the same instant, the direct current flowing through the coil L2, is in a direction opposite to the alternating current. The direct current thus produces a flux which acts to decrease the total flux in leg c. This procedure is exactly the reverse of that previously described, but a new condition of unbalance exists in the bridge circuit. As before, the magnitude depends upon the extent to which reactor leg a has been further saturated, but for any given cycle the degree of saturation reached will be practically the same in alternate legs of the reactor. The result is another alternating current potential difference between point A of the reactor circuit and the potential reference tap B. As before, an alternating current output voltage is induced in the secondary of the output transformer, and this voltage has a value that is many times the power level of the direct current input signal.

The major frequency component in the output is the second harmonic of the driving voltage $E_{ac}$ (twice the line frequency). This is indicated by the output voltage wave shown in Fig. 3. The phenomena can be visualized if one considers the potential at point A in Fig. 1 to be oscillating between the potentials at points C and D. The potential at the reference point B is considered fixed. It was previously mentioned that resistances R1 and R2 were maintained small compared to the combined resistance and inductance of reactor coils L1 and L2 so as to provide a fixed potential reference tap at point B for the voltage $E_{ac}$. For simplicity of description phase angle relationships will be ignored, and it will be assumed that the inductances of the reactor coils effectively become zero during portions of the cycle.

At any given instant, say at the start of one alternating current cycle (0 degrees), let C be positive and D negative with respect to the fixed potential reference tap B. The direct current polarity will be as noted. With no direct current signal the ratio of reactor coil impedances equals the ratio of resistances R1 and R2 so that the bridge circuit is balanced and no potential difference exists in the output circuit. In this case the potential at point A remains midway between potentials C and D, the position of null balance. Now assume that a direct current signal is received by the amplifier with the polarity as indicated in full line arrows in Fig. 1. The direct current signal causes the inductance of coil L2 to decrease such that a larger current will flow in the coil at the peak of the positive half cycle. The potential at point A is effectively equal to the potential at point C and an alternating current voltage with a maximum positive peak is developed across the output. At the midpoint of the cycle (180 degrees), the alternating current polarity is reversed and point D becomes positive and point C is negative with respect to the potential reference tap B. The direct current signal causes the inductance of coil L1 to decrease such that a larger current will flow in the coil at the peak of the negative half cycle. The potential at point A thus effectively approaches a value more nearly equal to that of point D and an alternating current voltage, again with a maximum positive peak, is developed across the output. These two voltages combine to induce in the secondary of the output transformer a signal of the general shape shown in Fig. 3, with two cycles occurring for each cycle of the impressed alternating current voltage $E_{ac}$. From the previous discussion it can be seen that the peak value of the output voltage is a function of the impressed direct current control signal. It can be shown that if the sign of the input voltage is reversed, the sign of the output (at any instant) is also reversed.

The signal voltage introduced into the magnetic amplifier can be derived from a potentiometer circuit. The potentiometer circuit operates on the "null balance" principle by which the voltage developed in the thermocouple is measured by balancing against a known adjustable voltage supplied by a dry battery. The known voltage source is maintained at a constant value by means of a standardizing rheostat.

In the application of the potentiometer circuit to the measurement of temperatures by means of a thermocouple, the voltage developed between the hot and cold junction of the thermocouple (as the result of the temperature difference between the junctions) is measured.

A change in temperature of the thermocouple produces an unbalanced signal voltage in the potentiometer circuit which forces current through the reactor coils of the magnetic amplifier. The magnitude of this unbalance is proportional to the amount of temperature change and the polarity depends on the direction of the change. The final output, which in this case is alternating current, operates a two-phase slide-wire motor to balance the potentiometer circuit. This motor may also be utilized to operate a recorder or adjust the quantity under control. Where a greater amplification of the original input signal is desired than can be accomplished by a single magnetic amplifier, cascading of magnetic amplifier stages of the same type as previously considered, can be employed as shown in Fig. 4. The output of one stage would be fed to the input of another, and feed-back could be incorporated to decrease the effect of the circuit time constant and improve stability and linearity. However, the signal input requirement for the magnetic amplifier is a direct voltage signal, and the output due to the modulator action, as previously shown, is an alternating potential. Therefore, some means must be provided for converting the amplifier alternating current signal voltage from the previous stage into a direct current voltage for the following stage. Also, the new input signal should possess the same polarity as the original error voltage.

This result can be accomplished by means of a phase sensitive or phase discriminating device. By definition such a device is one sensitive to both phase reversal and phase shift. The output is a direct voltage with a polarity dependent upon the phase of the alternating signal potential (amplifier output) compared to a reference or polarizing voltage, and is proportional to the product of the alternating potential and the cosine of the phase angle involved. The resulting direct current voltage will have the same polarity as the original signal but, due to previous amplification, will be at a higher power level for admission to the next amplifying stage. The manner in which the phase sensitive circuit accomplishes this will now be described.

A reference voltage is applied to the primary of a transformer T1 comprising two secondary reference voltage windings S1 and S2. It should be mentioned at this time that there would be an additional pair of secondary reference voltage windings for each additional stage of magnetic amplification, and for final output if required. The primary reference voltage is supplied to the transformer T1 by means of a conventional full wave bridge type rectifier composed of dry disc elements such as selenium. The rectifier is excited from the same alternating current source as the magnetic amplifier. The output of the rectifier is direct current with an alternating current ripple component that is twice the applied line frequency. A series connected condenser C1 is inserted as shown to block the direct current from the primary winding of transformer T1, and this direct current energy is dissipated in the load resistor R3. A parallel connected condenser C2 is inserted as shown to resonate with the primary impedance of the transformer T1, thereby enmpasizing the 120 cycle component of the alternating current ripple voltage. This ripple voltage from the rectifier induces an alternating voltage in the secondary windings S1 and S2 of the reference transformer T1 which is the second harmonic of the impressed line frequency. In this way the reference voltage has the same major frequency component as the output voltage from the magnetic amplifier.

The alternating current output of the magnetic amplifier is fed to the reference voltage source by means of the output or coupling transformer T2 which serves to isolate the various amplifier stages from each other. A parallel connected condenser C3 is inserted across the primary winding of transformer T2 to resonate with this winding, thus producing the most efficient power transfer of the 120 cycle component of the output current. A voltage is induced in the secondary winding of transformer T2 which is fed to the center taps on the secondary reference voltage windings S1 and S2 of transformer T1. The voltage outputs from the secondary reference voltage windings S1 and S2 are connected to dry disc type rectifier elements, such as selenium, as shown. These rectifiers are connected as two full-wave center-tapped bridge circuits with a common return lead c connected to the center tap on the secondary of the coupling transformer T2. In this way, a direct voltage that is the difference voltage existing between respective rectifier outputs and the common return lead c is developed across the output of the phase sensitive circuit.

Filter condensers C4 and C5, and load resistors R4 and R5, are connected between the rectifier outputs and the common return lead. The actual values of the filter condensers and load resistances will be governed by the input impedance of the succeeding stage which must be properly matched. The direct current output (difference voltage) of the phase sensitive circuit is then fed directly to the signal voltage input of the next magnetic amplifier stage.

Referring to Fig. 4, let it be assumed that voltage $E_{ac}$ is supplied to the reference voltage source to produce, as previously described, a reference voltage $E_p$ in the secondary of transformer T1. This voltage, for an input line frequency of sixty cycles, will have an output frequency of one hundred twenty cycles to correspond with the major frequency component of the signal voltage from the magnetic amplifier. Assume instantaneous polarities in the reference voltage secondary windings S1 and S2 of transformer T1 to be shown. Then the direct current conducting paths will be in the direction of the short solid arrows. The direction of reference current flow across the load resistances R4 and R5 will be the same for any instantaneous polarity of the reference voltage. Now, assume an alternating signal voltage $E_s$ from the output of the first magnetic amplifier to be applied to the coupling transformer T2 with an instantaneous polarity as noted. The secondary signal voltage $E_s'$ will be very small compared to the reference voltage $E_p$. The polarity shown across the secondary of coupling transformer T2 indicates that the signal voltage $E_s'$ is in phase with the reference voltage $E_p$ at the given instant. For each reversal of polarity (half-cycles), experienced by the reference voltage $E_p$, the signal voltage $E_s'$ will go through the same reversal, and the two voltages remain in phase. Therefore, for the signal voltage $E_s'$, current will flow in a direction indicated by the short dotted arrow for one instantaneous polarity, and in the other half of secondary winding S1 for the reversed instantaneous polarity.

For the polarities indicated, and following through the direct current conducting paths, it can be seen that the small signal voltage $E_s'$ adds to the polarizing or reference voltage $E_p$ across the load resistor R4, and subtracts from the reference voltage $E_p$ across the load resistor R5. This action is the same, regardless of instantaneous polarities, as long as the signal voltage $E_s'$ and the reference voltage $E_p$ are in phase. It might be mentioned that the magnitudes of the voltages developed across the load resistances will be related to the phase angle between the signal voltage $E_s'$ and the reference voltage $E_p$, and will be a maximum at 0 or 180 degrees of phase difference. This is due to the fact that if the phase difference between the signal voltage and the reference voltage is not exactly 0 or 180 degrees, signal current can flow only part of each half-cycle. The output is then related to the cosine of the phase angle involved.

It was previously stated that for the assumed conditions, the signal voltage $E_s'$ and the reference voltage $E_p$ were in phase. The polarities of points X and Y of Fig. 4 are both positive with respect to the common return lead $c$. For this in-phase-condition, the voltage at X is more positive with respect to the common return lead $c$ than the voltage at point Y. This is due to the fact that the signal voltage $E_s'$ adds to the reference voltage $E_p$ across resistor R4, and subtracts across resistor R5. Therefore, with respect to the output, point X is positive and point Y is negative. It is this direct current voltage that is impressed on the succeeding magnetic amplifier stage.

However, let it be assumed that a direct signal voltage of reversed polarity is impressed on the first stage of the magnetic amplifier. This signal will result in an alternating output $E_s$ the polarity of which (at any instant) will be the reverse of that previously described. In other words, the output signal will be 180 degrees out of phase with the A. C. voltage impressed on the amplifier. This voltage will be fed to the coupling transformer T2 of the phase sensitive device in the same manner as described above, but the alternating signal $E_s'$ will be 180 degrees out of phase with the reference voltage $E_p$. The results of this method of operation will now be considered.

Referring again to Fig. 4, it will be assumed that the reference voltage $E_p$ in the secondary of transformer T1 has the same instantaneous polarity as previously considered and as indicated. Then the direct current conducting paths will be the same, in the direction of the short solid arrows. As before, the direction of reference current flow across the load resistances R4 and R5 will be the same for any instantaneous polarity of the reference voltage. With an alternating signal voltage $E_s$ from the output of the first magnetic amplifier 180 degrees out of phase with the reference voltage $E_p$, the signal voltage polarity shown in Fig. 4 will be reversed, and the direction of signal current flow will be opposite to that shown (short dotted arrow). As before, the signal voltage $E_s'$ will be very small compared to the reference voltage $E_p$. For each reversal of polarity (half-cycle) experienced by the reference voltage $E_p$, the signal voltage $E_s'$ will go through a similar reversal, but will always be 180 degrees out of phase with the reference voltage as long as the initial condition is maintained. Thus, for the polarities indicated, and following through the direct current conducting paths, it can be seen that the small signal voltage $E_s'$ subtracts from the reference voltage $E_p$ across the load resistor R4 and adds to the reference voltage across the load resistor R5. This action is the same, regardless of instantaneous polarities, as long as the signal voltage $E_s'$ and the reference voltage $E_p$ are 180 degrees out of phase. As before, the polarities of points $x$ and $y$ of Fig. 4 are both positive with respect to the common return lead $c$. However, for this out of phase condition, the voltage at $x$ is now less positive with respect to the common return lead $c$ than the voltage at point $y$. Therefore, with respect to the output, point $x$ is negative and point $y$ is positive. The output voltage across points $x$ and $y$ is equal to the difference in voltage drops across load resistors R4 and R5, and this voltage is approximately twice the signal voltage $E_s'$.

In this way, the phase sensitive device converts the amplifier alternating output of a magnetic amplifying stage into a direct current signal possessing the characteristics of the original signal, but at a much higher power level. This output may be utilized to excite an additional stage of magnetic amplification (as shown), or it may be used as the final output for control purposes where an alternating current signal is undesirable.

It will be noted that the major difference existing between this magnetic amplifier in Fig. 4 and the basic circuit previously discusssed and illustrated in Fig. 1, is the substitution of a power transformer T3 with a center tapped secondary for the resistances R1 and R2 which were shown in the basic circuit. The secondary windings of transformer T3 are common to all amplifying stages. The magnitude of the secondary voltage is relatively high (in the order of 500 volts). This high voltage is required to provide sufficient current flowing in the turns of the reactor coils Z normally (without D. C. excitation) to maintain the flux density in the reactor core material well up on the permeability curve (see Fig. 2).

In this discussion it has been assumed that the secondary voltage 6 T3 is relatively high. It will be understood that the magnitude of the voltage required is controlled by the design of the magnetic amplifier circuit.

The modified form of the invention shown in Fig. 5 differs from the arrangement shown in Fig. 1 in that a third coil L3 is wound on the center leg $b$ of the core. The coil L3 consists of a number of turns of wire of a size dependent upon the impedance of the input signal voltage. In this modification the input signal voltage is applied across the terminals of coil L3 instead of across the terminal A and the upper terminal of the primary winding of transformer T2 of Fig. 1. For increased gain, it is advantageous that a low resistance choke L be employed to keep A. C. currents at a minimum in the input signal circuit.

The direct current control winding or coil on the center leg of the reactor is entirely independent of the alternating current circuit. Therefore the sole factor in the design of this direct current coil is matching it to the source impedance. Thus, if the direct current control signal to the first stage were derived from a thermocouple, the coil would be composed of relatively large wire of low resistance to match the thermocouple. Similarly, control windings for succeeding stages would be designed for impedance match to the phase sensitive circuits.

The major advantage of the modified form of the invention over that shown in Fig. 1 is the independence of impedance matching. Furthermore, in this modification it will be seen that the direct current control circuit is isolated, and is independent of the amplifier circuit ground. Thus separate grounding of the direct current control circuit can be made at the most convenient location. Another advantage of the separate direct current control winding is the possibility of utilizing a center tapped coil for push-pull coupling to a phase sensitive device.

The principal disadvantage of this modified magnetic amplifier is that there is a loss by a factor of approximately 3½ in amplification compared to the two-coil saturable reactor of Fig. 1. This is due to a less efficient utilization of the effective window area in the core material by the alternating and direct current coils. In the two-coil saturable reactor the coils serve dual purposes by carrying both the alternating current and direct current flux producing currents. Thus the effective coil area devoted to each purpose is materially greater for the same size of reactor core which results in a correspondingly larger gain per stage.

The operation of this modified magnetic amplifier and modulator as well as its combination in a system similar to that illustrated in Fig. 4 will be obvious from the foregoing description.

What we claim is:

1. In a magnetic modulator, a reactance bridge comprising four arms connected together to provide two pairs of conjugate points, two of said arms each having a fixed impedance connected therein, the other two arms each having a bridge coil connected therein, core means provided with two magnetic paths of magnetic material capable of being saturated, each bridge coil being in inductive relation to one of said magnetic paths, a source of magnetizing alternating current at a given frequency supplied through two conjugate points to said bridge coils to produce original magnetizing forces at a value to saturate said magnetic paths to approximately the saturation knee thereof, a source of variable electrical signals, means for supplying to the core means magnetizing forces proportional in value to said signals whereby the resulting magnetizing force at any instant assists the original magnetizing force in one bridge coil and opposes the original magnetizing force in the other bridge coil so that in each half cycle of the alternating current source the bridge coils alternately saturate said magnetic circuits, and output terminals coupled to said bridge whereby output voltages are developed at said terminals of a magnitude proportional to the signals and at a frequency twice that of the alternating source.

2. In a magnetic modulator, a reactance bridge comprising four arms connected together to provide two pairs of conjugate points, two of said arms each having a fixed impedance connected therein, the other two arms each having a bridge coil connected therein, core means provided with two magnetic paths of magnetic material capable of being saturated, each bridge coil being in inductive relation to one of said magnetic paths, a source of magnetizing alternating current at a given frequency supplied through two conjugate points to said bridge coils to produce original magnetizing forces at a value to saturate said magnetic paths to approximately the saturation knee thereof, a source of variable electrical signals, means for supplying through the other pair of conjugate points to said bridge coils direct magnetizing currents proportional in value to said signals whereby the resulting magnetizing force at any instant assists the original magnetizing force in one bridge coil and opposes the original magnetizing force in the other bridge coil so that in each half cycle of the alternating current source the bridge coils alternately saturate said magnetic circuits, and output terminals coupled to said bridge whereby output voltages are developed at said terminals of a magnitude proportional to the signals and at a frequency twice that of the alternating source.

3. In a magnetic modulator, a reactance bridge comprising four arms connected together to provide two pairs of conjugate points, two of said arms each having a fixed impedance connected therein, the other two arms each having a bridge coil connected therein, core means provided with two magnetic paths of magnetic material capable of being saturated, each bridge coil being in inductive relation to one of said magnetic paths, a source of magnetizing alternating current at a given frequency supplied through two conjugate points to said bridge coils to produce original magnetizing forces at a value to saturate said magnetic paths to approximately the saturation knee thereof, a magnetizing coil related to said magnetic paths, a source of variable electrical signals, means including said magnetizing coil for supplying to the core means magnetizing forces proportional in value to said signals whereby the resulting magnetizing force at any instant assists the original magnetizing force in one bridge coil and opposes the original magnetizing force in the other bridge coil so that in each half cycle of the alternating current source the bridge coils alternately saturate said magnetic circuits, and output terminals coupled to said bridge whereby output voltages are developed at said terminals of a magnitude proportional to the signals and at a frequency twice that of the alternating source.

4. In a magnetic modulator, a reactance bridge comprising four arms connected together to provide two pairs of conjugate points, two of said arms each having a fixed impedance connected therein, the other two arms each having a bridge coil connected therein, a shell type core providing two magnetic paths having a common return portion, said core made of material capable of being saturated, a bridge coil encircling a portion of each magnetic path, a source of magnetizing alternating current at a given frequency supplied through two conjugate points to said bridge coils to produce original magnetizing forces at a value to saturate said magnetic paths to approximately the saturation knee thereof, a magnetizing coil encircling the common portion of said magnetic paths, means including said magnetizing coil for supplying to the core magnetizing forces proportional in value to said signals whereby the resulting magnetizing force at any instant assists the original magnetizing force in one bridge coil and opposes the original magnetizing force in the other bridge coil so that in each half cycle of the alternating current source the bridge coils alternately saturate said magnetic circuits, and output terminals coupled to said bridge whereby output voltages are developed at said terminals of a magnitude proportional to the signals and at a frequency twice that of the alternating source.

CARLTON W. MILLER.
NATHANIEL B. NICHOLS.

REFERENCES CITED

The following references are of record in the file of this patent:

UNITED STATES PATENTS

| Number | Name | Date |
|---|---|---|
| 1,601,400 | Latour | Sept. 28, 1926 |